United States Patent [19]

Ward, deceased et al.

[11] 4,111,649

[45] Sep. 5, 1978

[54] DYESTUFF PREPARATIONS AND PROCESSES FOR THEIR PRODUCTION

[75] Inventors: Frank Ward, deceased, late of Gorton, England, by Robina Rutherford Flucker Ward, legal representative; John David Hildreth, Henbury Nr. Macclesfield; Herbert Alexander Potts, Stockport, both of England

[73] Assignee: Ciba-Geigy AG, Basel, Switzerland

[21] Appl. No.: 643,956

[22] Filed: Dec. 23, 1975

[30] Foreign Application Priority Data

Dec. 23, 1974 [GB] United Kingdom .............. 55530/74

[51] Int. Cl.² ............................................. C09B 27/00
[52] U.S. Cl. ............................................. 8/41 R; 8/43;
8/44; 8/54.2; 8/76; 8/85 R; 8/89 R; 8/178 R
[58] Field of Search ............... 8/41 R, 85, 76, 85 R, 8/89 R

[56] References Cited

U.S. PATENT DOCUMENTS

| | | | |
|---|---|---|---|
| 3,679,353 | 7/1972 | Streck | 8/79 |
| 3,681,320 | 8/1972 | Franklin et al. | 260/175 |
| 3,684,425 | 7/1972 | Ross et al. | 8/7 |
| 3,852,029 | 12/1974 | Bolliger et al. | 8/41 R |
| 3,898,033 | 8/1975 | McLeod | 8/26 |

FOREIGN PATENT DOCUMENTS

| | | |
|---|---|---|
| 1,336,032 | 11/1973 | United Kingdom. |
| 1,418,794 | 12/1975 | United Kingdom. |
| 1,426,982 | 3/1976 | United Kingdom. |

OTHER PUBLICATIONS

Hackh's Chemical Dictionary, Fourth Edition, (McGraw-Hill, New York), 1972, p. 446.

*Primary Examiner*—A. Lionel Clingman
*Attorney, Agent, or Firm*—Wenderoth, Lind & Ponack

[57] ABSTRACT

A process for the manufacture of stable, concentrated solutions of water-soluble tertiary ammonium salts of disazo dyestuffs is described, which comprises diazotizing 2 moles of the same primary aromatic amine or 1 mole each of different primary aromatic amines and reacting the diazo mixture with 1 mole of a compound which is able to couple with diazonium salt in at least 2 positions, in the presence of at least 2 moles of a tertiary amine and optionally other assistants. The resulting solutions prove stable even on prolonged storing at room temperature and are not affected by frost. The solutions are miscible in any ratio with water or, in part, also with suitable water-miscible organic solvents.

10 Claims, No Drawings

DYESTUFF PREPARATIONS AND PROCESSES FOR THEIR PRODUCTION

The invention concerns stable highly concentrated solutions of dyestuff preparations, processes for their production, as well as their use for dyeing textile fibres and especially paper material.

It is known that highly concentrated liquid commercial forms of dyestuffs may be manufactured by dissolving the dyestuff powders or pastes, in suitable aqueous, organic or organic-aqueous media, whereby highly concentrated liquid dyestuff preparations are produced, which, as regards handling and use, offer advantages in several aspects over the dry dyestuff preparations. The manufacture of such concentrated liquid preparations is, however, frequently associated with difficulties, since the dyestuffs used as starting products have in most cases been obtained by salting-out and therefore contain a considerable proportion of salts (electrolytes), which at times are disadvantageous when manufacturing the liquid preparations, and the presence of which can have an adverse influence on the stability of such solutions.

So it is known e.g. to manufacture stable, highly concentrated solutions of dyestuffs by a process which comprises condensing in an aqueous medium 2 moles of azo compounds that contain a primary amino group with an acylating agent, for example phosgene, in the presence of tertiary amines, which process overcomes the above disadvantages in that the dyestuff is not salted out primary to its use and therefore the solution to make contains no proportion of electrolytes.

The present invention provides another novel process for the manufacture of stable, concentrated solutions of watersoluble tertiary ammonium salts of disazo dyestuffs, which, in the main, comprises diazotising 2 moles of the same primary aromatic amine, or 1 mole of each of two different primary aromatic amines, and reacting the diazo mixture with 1 mole of a coupling component which is able to couple with a diazonium salt in at least two positions, in the presence of at least 2 moles of tertiary amine and optionally other assistants.

Suitable primary aromatic amines are aromatic or heteroaromatic amines which are able to form diazonium salts. These are, for example, primary amines of the anthraquinone, phthalocyanine or stilbene class, but especially of the naphthalene or benzene class. These compounds can be substituted, for example by halogen atoms, hydroxy, amino, lower alkyl and lower alkoxy, straight or branch-chained having 1 to 5 carbon atoms, aryl, aryloxy, acylamino, carboxy, sulphonic acid or nitro groups. In the process according to the invention, these amines can be used singly or also in admixture. The diazotisation of the amines is carried out by methods which are known per se, for example with sulphuric acid and sodium nitrite.

Suitable compounds which can be used as coupling components for the process according to the invention are those that are able to couple with a diazonium salt in at least 2 positions. Preferably these are compounds which consist of two optionally substituted naphthol units that are linked to each other through a bridge member, for example -NH- or -NH-CO-NH-. Especially the primary amines and coupling components used should contain altogether as many anionic groups, for example $SO_3H^\ominus$ or $COO^\ominus$, as are necessary to ensure the water solubility of the resultant dyestuff-ammonium salt. The resultant dyestuffs have as a rule altogether 2 to 8, preferably 3 to 6, sulphonic acid groups.

As tertiary amines which are to be used according to the invention there may, for example, be mentioned those of the formula

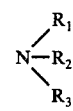

wherein $R_1$, $R_2$ and $R_3$ independently of each other denote methyl, ethyl, methoxyethyl or especially hydroxyethyl, and wherein $R_2$ and $R_3$ together with the nitrogen atom can also form a pyrrolidine, piperidine, morpholine or thiomorpholine ring.

There are mentioned for example trialkylamines, such as trimethylamine or triethylamine, triethanolamine, monoethanoldimethylamine, trimethoxyethylamine or N-alkylated pyrrolidine, piperidine, N-methylpiperidine, morpholine. N-methylmorpholine, thiomorpholine, 1,4-diazabicyclo-(2,2,2)-octane or hexamethylene-tetramine. Preferred is triethanolamine.

As further assistants which can optionally be present are mentioned: the amides of inorganic or organic acids, preferably carboxylic acid amides, e.g. those of monobasic or dibasic carboxylic acids, such as the amides of carboxylic acids containing up to 8 carbon atoms, preferably 1 to 4 carbon atoms, such as formamide, acetamide, propionic acid amide, and butyric acid amide, as well as malonic acid diamide. Urea and urea derivatives are particularly suitable; examples besides urea itself are substituted or unsubstituted alkylurea compounds such as methyl urea and ethyl urea, N,N'-dimethyl urea, and dihydroxyalkyl ureas. Further guanidine and its derivatives such as methyl guanidine are suitable. Also formamides such as alkylformamide, e.g. methyl- and dimethyl-formamide, can be used as well as sulphonic acid amides or diamides.

Further auxiliary agents are, for example, antifoaming agents, mono- and poly-ethyleneglycols and their ethers, N-methyl-2-pyrrolidone, secondary amines, e.g. diethanolamine, in amounts ranging from 5 to 30%.

The manufacture of the stable, concentrated solutions is most expediently carried out by diazotising the amine (or mixture of amines) in aqueous solution and adding the coupling component in a surplus of 1 to 50%, especially 1 to 25%, at 0° C. to 2.5° C. There are subsequently added 2 to 8 moles, in particular 2 to 5 moles, of tertiary amine per mole of resultant dyestuff. Towards the end of the coupling reaction the pH of the solution should be 6.5 to 8. Depending on the desired concentration of the preparation to be manufactured, the resultant solution can be diluted or concentrated, for example by evaporation.

Highly concentrated solutions are obtained which contain tertiary ammonium dyestuff salts of the dyestuffs which have the formula

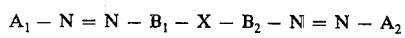

wherein $A_1$ and $A_2$ represent the radical of identical or different primary aromatic or heteroaromatic amines, $B_1$ and $B_2$ represent the radical of two different or, preferably, identical coupling components and X represents a bridge member, for example —NH— or —NH—CO—NH-.

The concentrated solutions of tertiary ammonium salts of direct dyestuffs obtained according to the invention contain:

(a) 5 to 50%, especially 10 to 30%, of a tertiary ammonium salt of a disazo dyestuff,
(b) 40 to 90% of water,
(c) 0 to 10% of an assistant.

The highly concentrated solutions prove stable even on prolonged standing at room temperature and are not affected by frost. The dyestuff neither crystallizes out nor decomposes. The solutions according to the invention are miscible in any ratio with water or, in part, also with suitable water-miscible organic solvents such as mono- and poly-ethylene glycols and their ethers or N-methyl-2-pyrrolidone, and can be easily added through a metering device.

In several instances the solutions can be used directly after manufacture without further dilution if storage is not to be too prolonged, i.e. risk of precipitation or crystallization occurring and/or viscosity is such that the product can be pumped/metered, i.e. flows readily. Usually in practical terms some dilution has to be carried out.

There may be particularly mentioned stable, concentrated solutions which contain:

(a) 10 to 30% of the triethanolamine salt of a dyestuff of the formulae

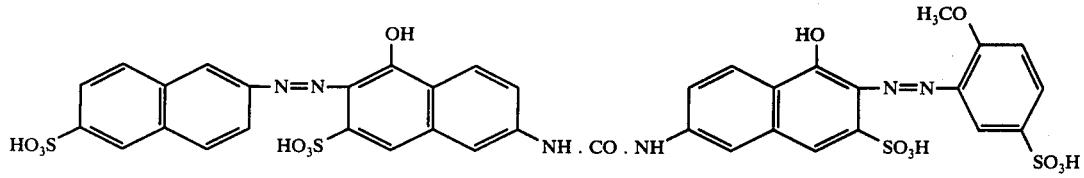

or

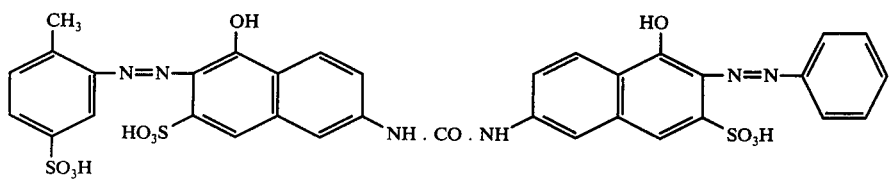

or

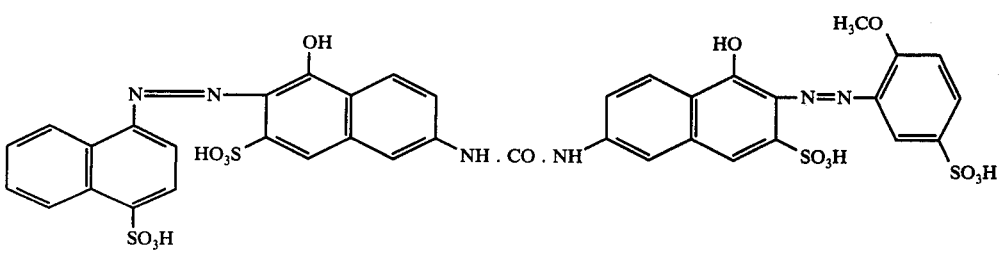

or

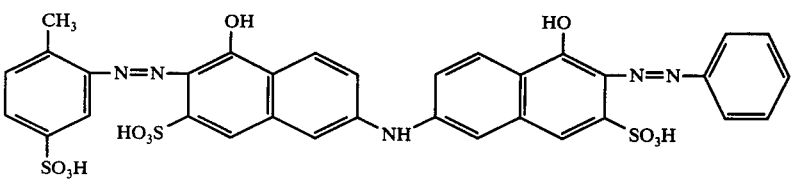

(b) 40 to 90% of water and
(c) 0 to 10% of an assistant.

The solutions according to the invention are above all suitable for the manufacture of dyeing solutions for dyeing paper, especially in the mass, and or dyeing textile, such as hydroxyl groups and N-containing textile materials, like cellulose (natural and regenerated), wool, silk, leather and nylon, but can also be used for other purposes.

The solutions, however, can also be thickened by the addition, for example, of a thickening agent, such as the alginate type, to produce printing pastes useful for the printing process.

In the non-limitative examples which follow, the parts, unless otherwise stated, denote parts by weight, the percentages denote percentages by weight and the temperatures are given in degrees Centigrade. The remaining percentages up to 100% of the obtained solutions are inorganic salts.

EXAMPLE 1

A concentrated, liquid preparation of the dye of the formula

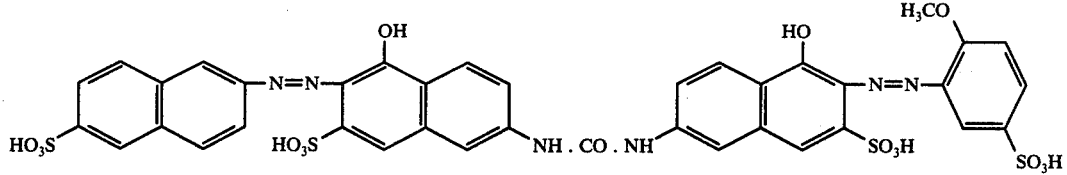

(triethanolamine salt)

is prepared as follows:

22.3 Parts of 2-naphthylamine-6-sulphonic acid (Bronner acid) and 20.3 parts of 1-amino-2-methoxybenzene-5-sulphonic acid are diazotised together at 18 to 20° by the known method with 48.3 parts of sodium nitrite 5N solution in 180 parts of water and 16.6 parts of sulphuric acid and with the additon of 75 parts of ice. To the diazo mixture is then added 51.0 parts of 5,5'-dihydroxy-7,7'-disulpho-2,2'-dinaphthyl urea (J-acid urea) followed by the addition of about 56.0 parts of triethanolamine to complete the coupling at a pH of 7.0 to 7.5. The dye solution may be filtered to remove any insoluble impurities, and is then diluted with 65.0 parts of water, after which approximately 535 parts of a preparation are obtained which is storable for several months at room temperature. The obtained solution contains 28% of the above dye salt and 67% of water. It gives bright scarlet dyeings on paper.

This solution is also useful to produce a print paste for printing paper by adding urea, alginate thickener, sodium dihydrogen phosphate and make up the whole with water.

EXAMPLE 2

A concentrated, liquid preparation of the direct dye of the formula

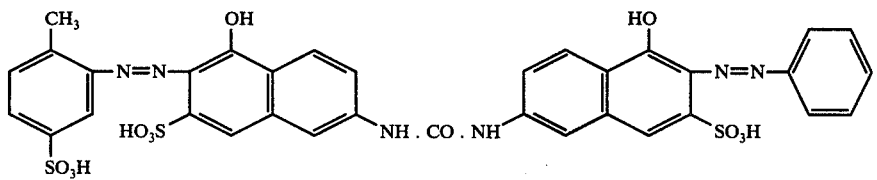

(triethanolamine salt)

is prepared as follows:

18.7 Parts of 1-amino-2-methyl-benzene-5-sulphonic acid and 9.3 parts of aniline are diazotised together at 0 to 5° by the known method with 48.3 parts of sodium nitrite 5N solution in 260 parts of water and 16.6 parts of sulphuric acid and with the addition of 250 parts of ice. To the diazo mixture is added 51.0 parts of 5,5'-dihydroxy-7,7'-disulpho-2,2'-dinaphthyl urea followed by the addition of approximately 35.0 parts of triethanolamine to complete the coupling at a pH of 7.0 to 7.5. The dye solution may be filtered to remove any insoluble impurities, and is then diluted with 30.0 parts of formamide and 50.0 parts of water, after which approximately 770 parts of a preparation are obtained which is storable for several months at room temperature. The obtained solution contains 16% of the above dye salt, 3.9% of formamide and 78% of water. It gives fast bright orange dyeings on paper and yields orange shades on cotton.

EXAMPLE 3

A concentrated, liquid preparation of a direct dye is prepared as follows: 151.5 Parts of 2-naphthylamine-5,7-disulphonic acid (as an acidic filter cake) are dissolved in 650 parts of water at 55°, the solution cooled to 40° and then cooled further to 5 to 10° by the addition of 200 parts of ice. Diazotisation is carried out by the addition of 120.8 parts of sodium nitrite 5N solution with the addition of a further 175 parts of ice to maintain the temperature at 5° to 10°. To the diazo solution is added 128 parts of 5,5'-dihydroxy-7,7'-disulpho-2,2'-dinaphthyl urea followed by the addition of approximately 140 parts of triethanolamine to complete the coupling at pH 7.0. Approximately 1560 parts of a preparation are obtained which contains the triethanolamine salt of the resultant disazo dye and which preparation is storable for several months at room temperature. The solution contains 30% of the triethanolamine salt of the above obtained direct dye and 65% of water.

It gives bright scarlet dyeings on paper. The liquid preparation, if so desired, may be shaded.

EXAMPLE 4

The dye of the formula

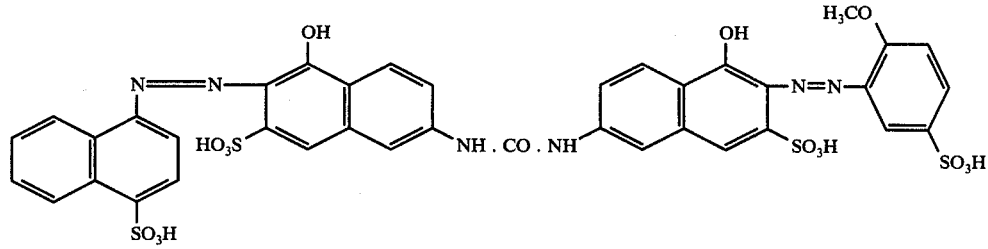

-continued
(triethanolamine salt)

is prepared in concentrated, liquid from viz:
11.1 Parts of naphthionic acid and 10.1 parts of 1-amino-2-methoxy-benzene-5-sulphonic acid are diazo-

EXAMPLE 7

The dye of the formula

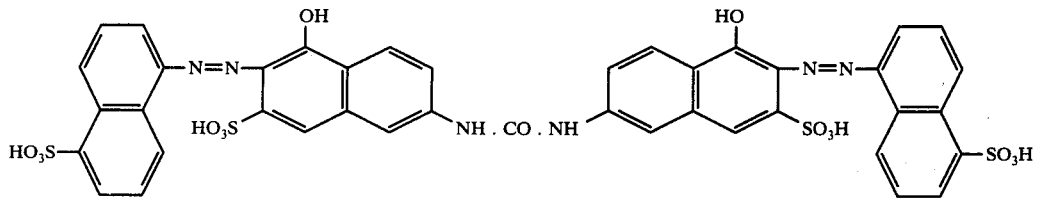

(triethanolamine salt)

tised together at 0 to 5° in the known manner with 24.2 parts of sodium nitrite 5N solution in 130 parts of water and 8.3 parts of sulphuric acid and with the addition of 75 parts of ice. To the diazo mixture is added 26.3 parts of J-acid-urea followed by the addition of approximately 19 parts of triethanolamine to complete the coupling at approximately pH 8.0. Approximately 305 parts of a free flowing liquid preparation are obtained which is stable on storage and dyes paper in scarlet-red shades.

The obtained solution contains 25% of the above dye salt and 71% of water.

EXAMPLE 5

A concentrated, liquid preparation of a direct dye is prepared as follows:

11.1 Parts of 1-naphthylamine-5-sulphonic acid (Laurents acid) and 10.1 parts of 1-amino-2-methoxy-benzene-5-sulphonic acid are first dissolved in 70 parts of water and 8 parts of ammonia solution (30%) and then acidified by addition of 9.8 parts of sulphuric acid. The mixture is diazotised at 0 to 5° by addition of 24.2 parts of sodium nitrite 5N solution and 75 parts of ice. To the diazo mixture is added 25.5 parts of J-acid-urea followed by the addition of approximately 17 parts of triethanolamine to complete the coupling at pH 7.0 to 7.5. Approximately 250 parts of a stable liquid preparation containing the triethanolamine salt of the resultant disazo dye are obtained. The solution contains 30% of the dye salt and 64% of water. It dyes paper in scarlet-red shades.

EXAMPLE 6

A concentrated, liquid preparation of a direct dye is prepared as follows:

11.1 Parts of naphthionic acid and 9.4 parts of 2-amino-toluene-5-sulphonic acid are diazotised together at 0° to 5° by the known method with 24.2 parts of sodium nitrite 5N solution in 100 parts of water and 8.3 parts of sulphuric acid and with the addition of 75 parts of ice. To the diazo mixture is added 26.3 parts of J-acid-urea followed by the addition of approximately 20 parts of triethanolamine to complete the coupling at pH 7.5 to 8.0. Approximately 275 parts of a liquid preparation containing the triethanolamine salt of the resultant disazo dye are obtained. The solution contains 27.6% of the dye salt and 67% of water. It dyes paper in scarlet shades.

is prepared in concentrated, liquid form as follows:
22.2 Parts of 1-naphthylamine-5-sulphonic acid (Laurents acid) are first dissolved in 50 parts of water and 10 parts of ammonia solution (30%) and then re-precipitated by addition of approximately 4 parts of concentrated sulphuric acid. After addition of a further 8.3 parts of sulphuric acid and 100 parts of ice/water, the product is diazotised at 0° to 5° by the addition of 24.2 parts of sodium nitrite 5N solution and a further 25 parts of ice to maintain the temperature at 0° to 5°. To the diazo solution is added 25.5 parts of J-acid-urea followed by the addition of approximately 28 parts of triethanolamine to complete the coupling at pH 7.0 to 8.0. Approximately 300 parts of a preparation are obtained which is storable for several months at room temperature and which dyes paper in scarlet-red shades. The obtained solution contains 25.8% of the dye salt and 68% of water.

EXAMPLE 8

The process described in Example 7 is repeated but using equivalent amounts of N-methylmorpholine in place of triethanolamine. Approximately 290 parts of a preparation are obtained which is storable for several months at room temperature and which dyes paper in scarlet-red shades. The solution contains 22.4% of the dye salt and 72% of water.

EXAMPLE 9

A concentrated, liquid preparation of a direct dye is prepared as follows: 30.3 Parts of 2-naphthylamine-5,7-disulphonic acid (as an acidic filter cake) are dissolved in 200 parts of hot water and 12.1 parts of mixed xylidines are added along with 2.5 parts of sulphuric acid. The mixture is stirred to a smooth paste and cooled to 0° with 250 parts of ice. Diazotisation is carried out by the addition of 48.5 parts of 5N sodium nitrite solution. To the diazo mixture, 50.9 parts of 5,5'-dihydroxy-7,7'-disulpho-2,2'-dinaphthyl urea are added, followed by the addition of 40 parts of triethanolamine to give a pH value of 7.2 to 7.5 when coupling is complete. Approximately 635 parts of a mobile liquid preparation which contains the triethanolamine salt of the resultant disazo dye is obtained which is storable for several months at room temperature. The obtained solution contains 24.2% of the dye salt and 73% of water. The product gives bright scarlet dyeings on paper.

EXAMPLE 10

The dye of the formula

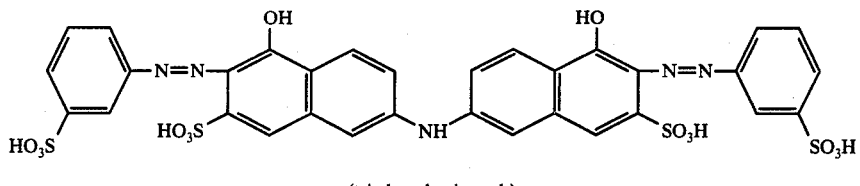

(triethanolamine salt)

is prepared in concentrated, liquid form viz: 34.6 Parts of metanilic acid (as an acidic filter cake) are slurried in 200 parts of water and 3.7 parts of sulphuric acid are added. The mixture is stirred to a smooth paste, 300 parts of ice are added and the diazotisation carried out by addition of 48.5 parts of 5N sodium nitrite solution. When diazotisation is complete, a mixture of 43 parts of triethanolamine together with 46.6 parts of 5,5'-dihydroxy-2,2'-dinaphthylamine-7,7'-disulphonic acid (RW acid) in 200 parts of water is added. The pH value is approximately 7.5 to 8.0 and coupling is complete. Approximately 875 parts of a mobile liquid are obtained which is storable at room temperature for several months and which dyes paper in scarlet-red shades.

The obtained solution contains 16% of the dye salt and 81% of water.

EXAMPLE 11

A concentrated, liquid preparation of the direct dye of the formula

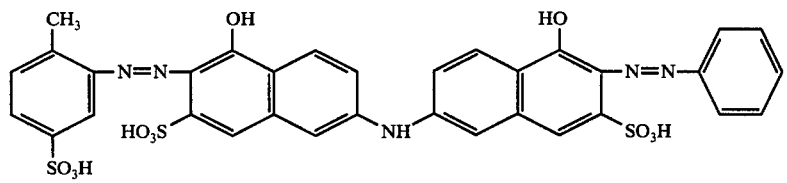

(triethanolamine salt)

is prepared as follows:

18.7 Parts of 1-amino-2-methyl-benzene-5-sulphonic acid and 9.3 parts of aniline are diazotised at 0° to 5° by the known method with 48.3 parts of sodium nitrite 5N solution, 16.6 parts of sulphuric acid and 250 parts of ice. The diazo mixture is added to a slurry of 43 parts of triethanolamine and 46.6 parts of 5,5'-dihydroxy-2,2'-dinaphthylamine-7,7'-disulphonic acid (RW acid) in 200 parts of water. The pH at the completion of coupling is 7.5 to 8.0. The product, which dyes paper in bright pink shades, is diluted to 1000 parts with water.

There is obtained a solution which contains 12.9% of the dye salt and 84% of water.

EXAMPLE 12

A concentrated liquid preparation of a direct dye is prepared as follows:

17.3 Parts of sulphanilic acid and 9.3 parts of aniline are first mixed together in 200 parts of water and 200 parts of ice, followed by the addition of 16.6 parts of sulphuric acid and diazotisation by the addition of 48.5 parts of 5N sodium nitrite solution. The diazo mixture is added to 43 parts of triethanolamine and 46.6 parts of 5,5'-dihydroxy-2,2'-dinaphthylamine-7,7'-disulphonic acid (RW acid) in 200 parts of water. The pH on completion of the coupling is 7.5 to 8.0. Approximately 780 parts of a mobile liquid which contains the triethanolamine salt of the resultant disazo dye are obtained which dyes paper in bright pink shades.

The obtained solution contains 16.7% of the dye salt and 79.5% of water.

EXAMPLE 13

From 1.0 to 30.0 parts of the liquid dye preparation from Example 2 are added with stirring to 100 parts of 50:50 bleached hardwood sulphate: softwood sulphite pulp of 30° average Schopper-Riegler, to which 0 to 2% of rosin size has been previously added.

After a delay of 0 to 10 minutes, 0 to 4% of aluminium sulphate is added and then the paper produced on the deckle as convenient (usually 1 to 10 minutes). The paper is dyed in fast bright orange shades.

We claim:

1. A process for the manufacture of stable, concentrated solutions of water-soluble tertiary ammonium salts of diazo dyestuffs, which comprises:

(1) diazotising a mixture selected from the group (a) 1 mole each of 2-naphthylamine-6-sulphonic acid and 1-amino-2-methoxy-benzene-5-sulphonic acid;

(b) 1 mole each of 1-amino-2-methyl-benzene-5-sulphonic acid and aniline; and (c) 1 mole each of naphthionic acid and 1-amino-2-methoxy-benzene-5-sulphonic acid in the presence of sulfuric acid and reacting the diazo mixture in the same vessel with 1 mole of 5,5'-dihydroxy-7,7'-disulpho-2,2'-dinaphthyl urea, or (2) diazotising 1 mole each of 1-amino-2-methyl-benzene-5-sulphonic acid and aniline in the presence of sulfuric acid and reacting the diazo mixture in the same vessel with 1 mole of 5,5'-dihydroxy-2,2'-dinaphthyl-amine-7,7'-disulphonic acid in the presence of at least 2 moles of a tertiary amine of the formula

wherein each of $R_1$, $R_2$ and $R_3$ independently represents methyl, ethyl, methoxyethyl or hydroxyethyl, or wherein $R_2$ and $R_3$ together with the nitrogen atom form a pyrrolidine, piperidine, morpholine or thiomorpholine ring.

2. A process according to claim 1 wherein the tertiary amine is triethanolamine.

3. A process according to claim 1 wherein the tertiary amine is employed in an amount of 2 to 8 moles.

4. A process according to claim 3 wherein the amount of tertiary amine is 2 to 5 moles.

5. A process according to claim 3 which comprises the use of at least one assistant selected from an amide of an inorganic or organic acid and an antifoaming agent.

6. A process according to claim 5 wherein formamide is employed as assistant.

7. A stable, concentrated solution of a water soluble tertiary ammonium salt of a direct dyestuff which contains
(A) 5 to 50% of a tertiary ammonium salt of a disazo dyestuff obtained by the process which comprises
 (1) diazotising a mixture selected from the group of
  (a) 1 mole each of 2-naphthylamine-6-sulphonic acid and 1-amino-2-methoxy-benzene-5-sulphonic acid;
  (b) 1 mole each of 1-amino-2-methyl-benzene-5-sulphonic acid and aniline; and
  (c) 1 mole each of naphthionic acid and 1-amino-2-methoxy-benzene-5-sulphonic acid
in the presence of sulfuric acid and reacting the diazo mixture in the same vessel with 1 mole of 5,5'-dihydroxy-7,7-disulpho-2,2'-dinaphthyl urea, or
 (2) diazotising 1 mole each of 1-amino-2-methyl-benzene-5-sulphonic acid and aniline in the presence of sulfuric acid and reacting the diazo mixture in the same vessel with 1 mole of 5,5'-dihydroxy-2,2'-dinaphthyl-amine-7,7'-disulphonic acid in the presence of at least 2 moles of a tertiary amine of the formula

wherein each of $R_1$, $R_2$ and $R_3$ independently represents methyl, ethyl, methoxyethyl or hydroxyethyl, or wherein $R_2$ and $R_3$ together with the nitrogen atom form a pyrrolidine, piperidine, morpholine or thiomorpholine ring (B) 40 to 90% water, and
(C) 0 to 10% of at least one assistant selected from an amide of an inorganic or organic acid and an antifoaming agent.

8. A stable, concentrated solution according to claim 7 wherein the tertiary amine is triethanolamine.

9. A stable, concentrated solution according to claim 7 containing component (c) in an amount up to 10%.

10. A stable, concentrated solution according to claim 9 wherein the component (c) is formamide.

* * * * *